(12) United States Patent
Hwang et al.

(10) Patent No.: US 9,783,039 B2
(45) Date of Patent: *Oct. 10, 2017

(54) POWER TRANSMISSION SYSTEM OF HYBRID ELECTRIC VEHICLE

(71) Applicant: Hyundai Motor Company, Seoul (KR)

(72) Inventors: Donghwan Hwang, Seoul (KR);
Changwook Lee, Suwon-si (KR);
Jongsool Park, Hwaseong-si (KR);
Kangsoo Seo, Yongin-si (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 315 days.

This patent is subject to a terminal disclaimer.

(21) Appl. No.: 14/556,609

(22) Filed: Dec. 1, 2014

(65) Prior Publication Data

US 2016/0046180 A1 Feb. 18, 2016

(30) Foreign Application Priority Data

Aug. 13, 2014 (KR) ........................ 10-2014-0105267

(51) Int. Cl.
*F16H 3/46* (2006.01)
*B60K 6/365* (2007.10)
(Continued)

(52) U.S. Cl.
CPC .............. *B60K 6/365* (2013.01); *B60K 6/445* (2013.01); *F16H 3/46* (2013.01);
(Continued)

(58) Field of Classification Search
CPC .............. F16H 3/46; F16H 2200/0056; F16H 2200/2007; F16H 2200/2038; B60K 6/365
See application file for complete search history.

(56) References Cited

U.S. PATENT DOCUMENTS 7,192,373 B2 * 3/2007 Bucknor ................ B60K 6/445
180/65.22
7,597,648 B2 * 10/2009 Conlon ................... B60K 6/365
180/65.7

(Continued)

FOREIGN PATENT DOCUMENTS

KR 10-2014-0067464 A 6/2014

*Primary Examiner* — Derek D Knight
*Assistant Examiner* — David Morris
(74) *Attorney, Agent, or Firm* — Morgan, Lewis & Bockius LLP

(57) ABSTRACT

A power transmission system of hybrid electric vehicle includes an input shaft, counter shaft, an output shaft, first motor/generator, second motor/generator, first planetary gear set, second planetary gear set to selectively externally gear-connect fourth rotation element to third rotation element through counter shaft while being directly connected to counter shaft and to directly connect fifth rotation element to output shaft and selectively connect sixth rotation element to transmission housing, first transfer gear disposed between second rotation element and output shaft, second transfer gear disposed between third rotation element and counter shaft, variable direct connection device to selectively connect two of three rotation elements of second planetary gear set, and variable connection device to selectively connect sixth rotation element to transmission housing or selectively external gear-connect third rotation element to fourth rotation element.

15 Claims, 7 Drawing Sheets

(51) Int. Cl.
*B60K 6/445* (2007.10)
*B60K 6/38* (2007.10)

(52) U.S. Cl.
CPC *B60K 2006/381* (2013.01); *F16H 2200/0056* (2013.01); *F16H 2200/2007* (2013.01); *F16H 2200/2038* (2013.01); *Y02T 10/6234* (2013.01); *Y10S 903/91* (2013.01); *Y10S 903/912* (2013.01); *Y10S 903/919* (2013.01)

(56) References Cited

U.S. PATENT DOCUMENTS

| | | | | |
|---|---|---|---|---|
| 8,241,166 | B2* | 8/2012 | Sung | B60K 6/40 475/280 |
| 8,905,882 | B2* | 12/2014 | Lee | B60K 6/365 180/65.26 |
| 8,905,892 | B1* | 12/2014 | Lee | B60K 6/42 475/317 |
| 9,090,155 | B2* | 7/2015 | Lee | B60K 6/387 |
| 9,174,523 | B2* | 11/2015 | Lee | B60K 6/42 |
| 9,371,892 | B2* | 6/2016 | Lee | B60K 6/445 |
| 2015/0148170 | A1* | 5/2015 | Lee | F16H 3/46 475/5 |

* cited by examiner

FIG. 2

| Mode | Shift stage | Friction element | | |
|---|---|---|---|---|
| | | CL1 | CL2 | BK |
| EV | 1ST | | | ● |
| | 2ND | ● | | |
| HEV | 1ST | | | ● |
| | 2ND | ● | | |
| | 3RD | | ● | |
| Engine | 1ST | | ● | ● |
| | 2ND | ● | ● | |

POWER TRANSMISSION SYSTEM OF HYBRID ELECTRIC VEHICLE

CROSS-REFERENCE TO RELATED APPLICATION

The present application claims priority to Korean Patent Application No. 10-2014-0105267 filed on Aug. 13, 2014, the entire contents of which is incorporated herein for all purposes by this reference.

BACKGROUND OF THE INVENTION

Field of the Invention

The present invention relates to a power transmission system of a hybrid electric vehicle, and more particularly, to a power transmission system of a hybrid electric vehicle capable of increasing a usage of a mechanical power transfer path by transferring a larger torque than an engine torque to an output shaft and maximally using power of an engine in a hybrid mode.

Description of Related Art

An environmentally-friendly technology of a vehicle is a core technology which controls a survival of a future automobile industry and advanced car makers have focused their own energy on the development of an environmentally-friendly vehicle to achieve environment and fuel efficiency regulations Therefore, each car maker has developed an electric vehicle (EV), a hybrid electric vehicle (HEV), a fuel cell electric vehicle (FCEV), and the like, as a future vehicle technology.

As described above, since the future vehicle has several technical restrictions such as weight, cost, and the like, the car makers have paid attention to the hybrid electric vehicle as an alternative to solve realistic problems such satisfaction of exhaust gas regulations and enhancement of fuel efficiency performance and are fiercely competing to commercialize the hybrid electric vehicle.

The hybrid electric vehicle is a vehicle using more than two power sources and may be combined in several ways. Here, as the power source, a combination of a gasoline engine or a diesel engine using traditional fossil fuel and a motor/generator driven by electrical energy is used.

The hybrid electric vehicle may be implemented as an EV mode driven only by a motor, an HEV mode simultaneously using the engine and the motor, and an engine mode using only the engine, depending on a combination of an engine and a motor.

Further, the hybrid electric vehicle drives a power generator using kinetic energy of a vehicle, instead of using idle stop stopping the engine at the time of stopping the vehicle and using braking by the existing friction at the time of braking the vehicle. In this case, it is possible to more remarkably enhance fuel efficiency than the typical vehicle due to fuel saving, and the like by regenerative braking to store electrical energy generated by the driving of the power generator in a battery and reuse the stored electrical energy at the time of driving.

As described above, a power transmission system of a hybrid electric vehicle is classified into a single mode scheme and a multi-mode scheme.

The single mode scheme may not require torque transfer mechanisms, such as a clutch and a brake, for a shift control, but may have reduced efficiency at the time of high-speed driving and thus low fuel efficiency and require an additional torque amplifier for applying to a large vehicle.

The multi-mode scheme may have high efficiency at the time of high-speed driving and may be designed to amplify a torque, and as a result, may be applied to a medium and large size vehicle.

Recently, therefore, the multi-mode scheme rather than the single mode scheme has been mainly adopted and thus a study thereon has been actively conducted.

The power transmission system based on the multi-mode scheme is configured to include a plurality of planetary gear sets, a plurality of motors/generators used as a motor and a power generator, a plurality of torque transfer mechanisms (friction elements) which may control rotation elements of the planetary gear set, a battery used as the power source of the motor/generator, and the like.

The power transmission system based on the multi-mode scheme has different operation mechanisms depending on a connection configuration of the planetary gear set, the motor/generator, and the toque transfer mechanism.

Further, the power transmission system based on the multi-mode scheme is different in durability, power transmission efficiency, a size, and the like depending on the connection configuration, and therefore in the field of the power transmission system of the hybrid electric vehicle, research and development to implement more robust, compact power transmission system without power loss has been continued.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of increasing a usage of a mechanical power transfer path by transferring a larger torque than an engine torque to an output shaft and maximally using power of an engine in a hybrid mode.

Further, various aspects of the present invention are directed to providing a power transmission system of a hybrid electric vehicle having advantages of using large engine power, reducing a mode conversion frequency by replacing an engine mode at the time of oscillation, and minimizing a change in a rotation speed of all the rotation elements at the time of mode conversion.

In addition, various aspects of the present invention are directed to providing a power transmission system of a hybrid electric vehicle having advantages of providing a drivable engine mode without an electrical load of a motor/generator to enhance fuel efficiency at the time of high-speed driving.

Moreover, various aspects of the present invention are directed to providing a power transmission system of a hybrid electric vehicle having advantages of minimizing a full length of a transmission by disposing each of the two motors/generators on different shafts, in particular, disposing one motor/generator on a separate dedicated shaft.

An exemplary embodiment of the present invention provides a power transmission system of a hybrid electric vehicle, including an input shaft configured to be input with power of an engine, a counter shaft configured to be disposed in parallel with an input shaft at a predetermined interval therefrom, an output shaft configured to be disposed on the same shaft line as the counter shaft, a first motor/ generator configured to be disposed on the input shaft to be operated as a motor and a generator, a second motor/generator configured to be disposed in parallel with the counter shaft at a predetermined interval therefrom to be externally gear-connected with the counter shaft, a first planetary gear set configured to be disposed on the input shaft to connect a first rotation element to the first motor/generator and externally gear-connect a second rotation element to the output shaft, and directly connect a third rotation element to the input shaft, a second planetary gear set configured to be disposed on the counter shaft to selectively externally gear-connect a fourth rotation element to the third rotation element through the counter shaft while being directly connected to the counter shaft and to directly connect a fifth rotation element to the output shaft and selectively connect a sixth rotation element to a transmission housing, a first transfer gear configured to be disposed between the second rotation element and the output shaft, a second transfer gear configured to be disposed between the third rotation element and the counter shaft, a variable direct connection means configured to selectively connect two of three rotation elements of the second planetary gear set, and a variable connection means configured to selectively connect the sixth rotation element to the transmission housing or selectively external gear-connect the third rotation element to the fourth rotation element.

The first planetary gear set may be configured of a single pinion planetary gear set, the first rotation element may be configured of a first sun gear, the second rotation element may be configured of a first planetary carrier, and the third rotation element may be configured of a first ring gear, and the second planetary gear set may be configured of the single pinion planetary gear set, the fourth rotation element may be configured of a second sun gear, the fifth rotation element may be configured of a second planetary carrier, and the sixth rotation element may be configured of a second ring gear.

The first planetary gear set may be configured of a double pinion planetary gear set, the first rotation element may be configured of a first sun gear, the second rotation element may be configured of a first ring gear, and the third rotation element may be configured of the first planetary carrier, and the second planetary gear set may be configured of the single pinion planetary gear set, the fourth rotation element may be configured of a second sun gear, the fifth rotation element may be configured of a second planetary carrier, and the sixth rotation element may be configured of a second ring gear.

The first planetary gear set may be configured of a single pinion planetary gear set, the first rotation element may be configured of a first sun gear, the second rotation element may be configured of a first planetary carrier, and the third rotation element may be configured of a first ring gear, and the second planetary gear set may be configured of a double pinion planetary gear set, the fourth rotation element may be configured of a second sun gear, the fifth rotation element may be configured of a second ring gear, and the sixth rotation element may be configured of a second planetary carrier.

A gear ratio may be set so that the first transfer gear performs a same speed input and the second transfer gear performs an increasing speed input.

The variable direct connection means may be configured of a fifth clutch disposed between the counter shaft including a fourth rotation element and the fifth rotation element.

The variable connection means may include a brake configured to be disposed between the sixth rotation element and the transmission housing, and a second clutch configured to be disposed between the third rotation element and the second transfer gear or between the fourth rotation element and the second transfer gear.

Further, in connection with the first clutch forming the variable direct connection means and the second clutch and the brake forming the variable connection means, in EV mode 1, the brake may be operated, in EV mode 2, the first clutch may be operated, in HEV mode 1, the brake may be operated, in HEV mode 2, the first clutch may be operated, in HEV mode 3, the second clutch may be operated, in engine mode 1, the second clutch and the brake may be operated, and in the engine mode 2, the first clutch and the second clutch may be operated.

According to the exemplary embodiments of the present invention, in the overall configuration, the two EV modes, the three hybrid modes, and the two engine modes may be implemented by the combination of the two planetary gear sets, the three friction elements, and the two motors/generators.

Further, according to the first exemplary embodiment of the present invention, the power of the engine is input to the third rotation element of the first planetary gear set and the power of the first motor/generator is input to the first rotation element to transfer a larger torque than the engine torque to the output shaft, thereby increasing the usage of the mechanical power transfer path and using the larger power of the engine than the specification of the same first motor/generator.

Further, according to the first exemplary embodiment of the present invention, the larger torque than the engine torque may be transferred to the output shaft to implement the high rotation operation with the large power of the engine at the same vehicle speed at the time of the WOT oscillation and obtain the larger acceleration.

Further, according to the first exemplary embodiment of the present invention, since in the HEV mode, the larger acceleration than the engine mode may be obtained, a necessity of conversion into the engine mode at the time of oscillation is removed to configure the relatively simple system and reduce the friction element depending on the mode reduction, thereby more increasing the efficiency.

Further, according to the first exemplary embodiment of the present invention, for natural conversion from the HEV mode 1 and the HEV mode 2 to the HEV mode 3, the second clutch is disposed between the third rotation element of the first planetary gear set and the sixth rotation element of the second planetary gear set to perform the conversion into the HEV mode 3 after the engine and the second motor/generator are synchronized with each other by the operation of the second clutch, thereby naturally performing the mode conversion.

Therefore, according to the first exemplary embodiment of the present invention, the impact may not occur due to the engagement of the second clutch, the torque directions of the first motor/generator and the second motor/generator are maintained as they are before and after the mode conversion, thereby making the controllability excellent.

Further, as described above, after the conversion into the HEV mode 3, the engine may be continuously operated at a maximum power point and the second motor/generator may be operated within the motor driving limitation range since the rotation speed is gradually reduced as the vehicle speed is increased.

Further, it is possible to perform the driving without the electrical load of the first and second motors/generators by providing the engine mode at the time of the high-speed driving, thereby improving the fuel efficiency.

Further, it is possible to minimize the full length of the transmission by disposing each of the first and second motors/generators on different shafts but disposing the second motor/generator on the separate dedicated shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each operation mode of the friction elements which are applied to the power transmission system according to the various exemplary embodiments of the present invention.

Figure 1:
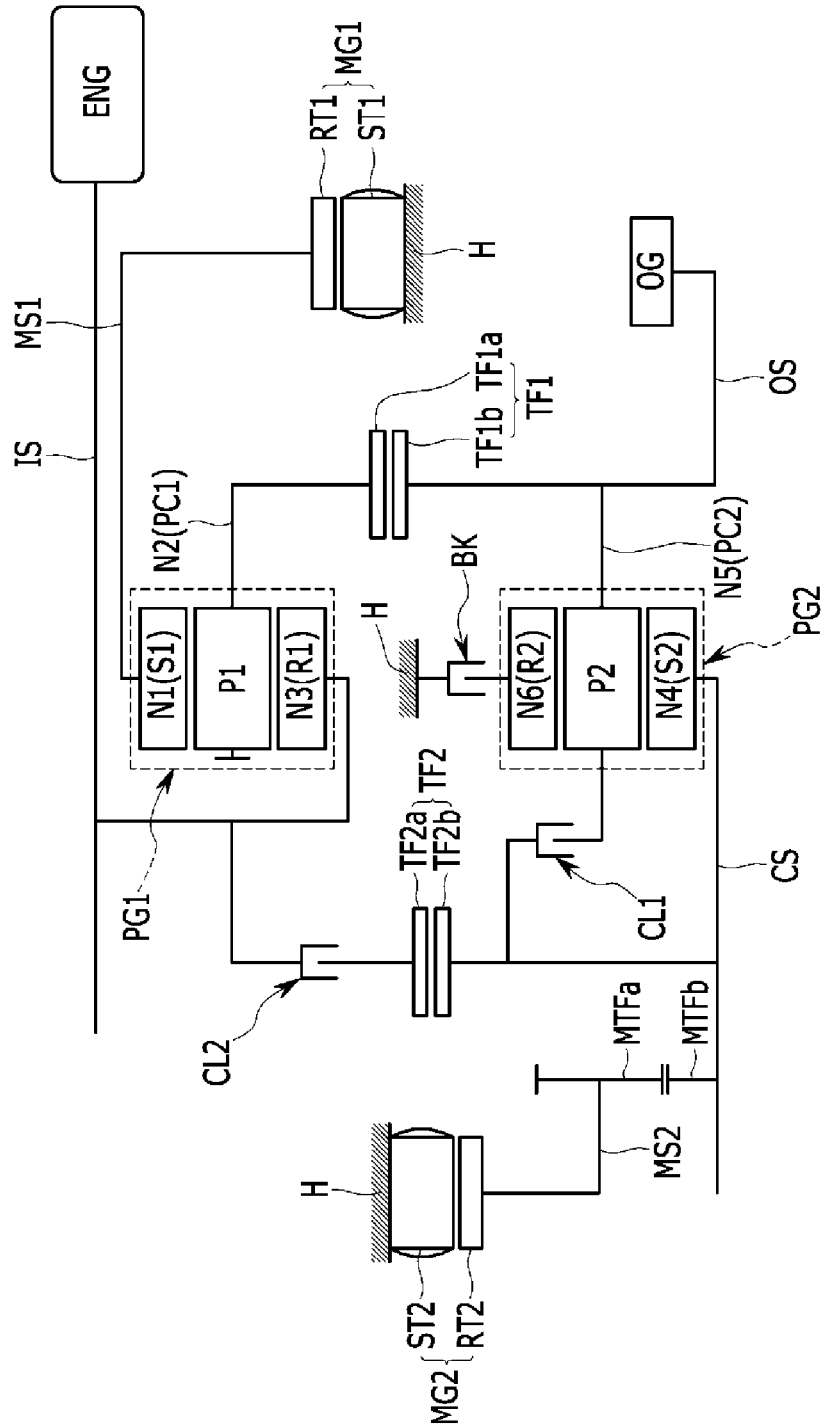
FIG. 1 is a configuration diagram of a power transmission system according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

However, portions unrelated to the description will be omitted in order to obviously describe exemplary embodiments of the present invention, and same or similar reference numerals will be used to describe same or similar components throughout the present specification.

In the following description, the reason of differentiating names of components into a first, a second, and the like is to differentiate components having the same name and therefore an order thereof is not necessarily limited thereto.

FIG. 1 is a configuration diagram of a power transmission system of a hybrid electric vehicle according to a first exemplary embodiment of the present invention.

Referring to FIG. 1, a power transmission system of a hybrid electric vehicle according to a first exemplary embodiment of the present invention is configured to include a variable direct connection means which includes an input shaft IS, a counter shaft CS, an output shaft OS, first and second planetary gear sets PG1 and PG2, first and second motors/generators MG1 and MG2, and a first clutch CL1 and a variable connection means which includes a second clutch CL2 and a brake BK.

The input shaft IS is an input member which is connected to an output side of an engine to receive rotation power of the engine and is provided with a first planetary gear set PG1 and a first motor/generator MG1.

The counter shaft CS is disposed in parallel with the input shaft IS at a predetermined interval therefrom and is provided with a second planetary gear set PG2 and a second motor/generator MG2.

The output shaft OS is an output member which is disposed on the same shaft line as the counter shaft CS and is integrally formed with an output gear OG.

The first planetary gear set PG1 includes first, second, and third rotation elements N1, N2, and N3 and the second planetary gear set PG2 is disposed on the input shaft IS and the counter shaft CS while including fourth, fifth, and sixth rotation elements N4, N5, and N6.

The first rotation element N1 is connected to the first motor/generator MG1 through a first motor shaft MS1, the second rotation element N2 is externally gear-connected to the output shaft OS through a first transfer gear TF1, and the third rotation element N3 is directly connected to the input shaft IS.

The fourth rotation element N4 is externally gear-connected to the second motor/generator MG2 while being directly connected to the counter shaft CS, the fifth rotation element N5 is directly connected to the output shaft OS, and the sixth rotation element N6 is selectively connected to a transmission housing H.

The first, and second transfer gears TF1 and TF2 each are configured to include first and second transfer driver gears TF1*a* and TF2*a* which are externally connected to each other and first and second transfer driven gears TF1*b* and TF2*b*.

The first transfer drive gear TF1*a* of the first transfer gear TF1 is connected to the second rotation element N2 and the first transfer driven gear TF1*b* which is externally gear-connected to the first transfer drive gear TF1*a* is connected to the output shaft OS.

The second transfer drive gear TF2*a* of the second transfer gear TF2 is directly or selectively connected to the third rotation element N3 and the second transfer driven gear TF2*b* which is externally gear-connected to the second transfer drive gear TF2*a* is directly or selectively connected to the counter shaft CS.

When the second transfer drive gear TF2*a* of the second transfer gear TF2 is selectively connected to the third rotation element N3, the second transfer driven gear TF2*b* is directly connected to the counter shaft CS and when the second transfer drive gear TF2a is directly connected to the third rotation element N3, the second transfer driven gear TF2b is selectively connected to the counter shaft CS.

Further, a gear ratio is set so that the first transfer gear TF1 performs a same speed input and the second transfer gear TF2 performs an increasing speed input.

The first motor/generator MG1 and the second motor/generator MG2 each have the motor and generator functions as an independent power source.

The first motor/generator MG1 serves as a motor which is connected to the first rotation element N1 of the first planetary gear set PG1 to supply rotation power or serves as a power generator which generates electricity while rotating by a torque of the first rotation element.

The second motor/generator MG2 serves as the motor which is connected to the fourth rotation element N4 of the second planetary gear set PG2 to supply rotation power or serves as the power generator which generates electricity while rotating by the torque of the fourth rotation element.

To this end, the first motor/generator MG1 is disposed on the input shaft IS along with the first planetary gear set PG1 and the second motor/generator MG2 are disposed in parallel with the counter shaft CS and are thus disposed at the counter shaft CS and an external gear and is configured to include first and second stators ST1 and ST2 which are fixed to the transmission housing H and first and second rotors RT1 and RT2 which are disposed in a radial inside of the first and second stators ST1 and ST2.

The first clutch CL1 which is a variable direct connection means selectively makes the second planetary gear set PG2 be in a direct connection state. To this end, the first clutch CL1 selectively connects two of the three rotation elements of the second planetary gear set PG2.

The second clutch CL2 and the brake BK are a variable connection means, in which the second clutch CL2 selectively connects the third rotation element N3 of the first planetary gear set PG1 to the second transfer driver gear TF2a of the second transfer gear TF2 or selectively connects the second transfer gear TF2 to the counter shaft CS and the brake BK selectively connects the sixth rotation element N6 of the second planetary gear set PG2 to the transmission housing H.

As described above, the first and second clutches CL1 and CL2 are a known friction member selectively connecting between the rotation elements and the brake BK is a known friction member selectively connecting the rotation elements to the fixed element (transmission housing) and may be multi-plate type hydraulic friction members which are friction-coupled with each other by oil pressure.

The power transmission system of a hybrid electric vehicle according to the first exemplary embodiment of the present invention configured as described above will be described below in more detail.

The first planetary gear set PG1 which is a single pinion planetary gear set is configured to include the first rotation element N1 configured of a first sun gear S1, the second rotation element N2 configured of a first planetary carrier PC1 supporting a first pinion P1 externally engaged with the first sun gear S1, and the third rotation element N3 configured of a first ring gear R1 internally engaged with the first pinion P1.

The second planetary gear set PG2 which is the single pinion planetary gear set is configured to include the fourth rotation element N4 configured of a second sun gear S2, the fifth rotation element N5 configured of a second planetary carrier PC2 supporting a second pinion P2 externally engaged with the second sun gear S2, and the sixth rotation element N6 configured of a second ring gear R2 internally engaged with the second pinion P2.

The first planetary gear set PG1 is disposed on the input shaft IS along with the first motor/generator MG1 and the second planetary gear set PG2 is disposed on the counter shaft CS which is disposed in parallel with the input shaft IS along the second motor/generator MG2 at a predetermined interval from the input shaft IS.

Describing the connection relationship among the respective rotation elements forming the first planetary gear set PG1 and the second planetary gear set PG2, the first sun gear S1 is directly connected to the first motor/generator MG1, the first planetary carrier PC1 is externally gear-connected to the output shaft OS through the first transfer gear TF1, and the first ring gear R1 is directly connected to the input shaft IS.

The second sun gear S2 is connected to the second motor/generator MG2 while being directly connected to the counter shaft CS, the second planetary carrier PC2 is selectively connected to the counter shaft CS while being directly connected to the output shaft OS, and the second ring gear R2 is selectively connected to the transmission housing H.

As described above, the output shaft OS is disposed on the same shaft line as the counter shaft CS and includes an output gear OG, in which the output gear OG transfers the rotation power to a driving wheel through a differential from a final reduction gear which is not illustrated.

The first transfer drive gear TF1a of the first transfer gear TF1 is connected to the first planetary carrier PC1 and the first transfer driven gear TF1b which is externally gear-connected to the first transfer drive gear TF1a is directly connected to the output shaft OS.

The second transfer drive gear TF2a of the second transfer gear TF2 is selectively connected to the first ring gear R1 and the second transfer driven gear TF2b which is externally gear-connected to the second transfer drive gear TF2a is directly connected to the counter shaft CS.

The first motor/generator MG1 and the second motor/generator MG2 each have the motor and generator functions as an independent power source.

The first motor/generator MG1 serves as the motor which is connected to the first sun gear S1 of the first planetary gear set PG1 to supply rotation power or serves as the power generator which generates electricity while rotating by the torque of the rotation element.

To this end, the first motor/generator MG1 is disposed on the input shaft IS along with the first planetary gear set PG1 to be directly connected to the first sun gear S1 through the first motor shaft MS1 which is disposed on the input shaft IS without the rotation interference.

The second motor/generator MG2 serves as the motor which is connected to the second sun gear S2 of the second planetary gear set PG2 to supply rotation power or serves as the power generator which generates electricity while rotating by the torque of the rotation element.

To this end, the second motor/generator MG2 is disposed in parallel with the counter shaft CS at a predetermined interval from the counter shaft CS to be externally gear-connected to the counter shaft CS.

That is, a motor drive gear MTFa is disposed on a second motor shaft MS2 of the second motor/generator MG2 and a motor driven gear MTFb externally gear-connected to the motor drive gear MTFa is disposed on the counter shaft CS to make the second motor/generator MG2 be externally gear-connected to the counter shaft CS.

The first clutch CL1 which is a variable direct connection means is disposed to selectively connect the counter shaft CS directly connected to the second sun gear S2 of the second planetary gear set PG2 to the second planetary carrier PC2 so that the second planetary gear set PG2 is selectively in a direct connection state.

The brake BK of the second clutch CL2 is a variable connection means and the second clutch CL2 is disposed to selectively connect the first ring gear R1 of the first planetary gear set PG1 to the second transfer gear TF2 and the brake BK is disposed to selectively connect the second ring gear R2 of the second planetary gear set PG2 to the transmission housing H.

FIG. 2 is an operation table for each operation mode of the friction elements which are applied to the planetary gear train according to the first exemplary embodiment of the present invention.

Referring to FIG. 2, an operation state of the friction elements for each operation mode will be described below.

In EV mode 1, the brake is operated, in EV mode 2, the first clutch is operated, in HEV mode 1, the brake is operated, in HEV mode 2, the first clutch is operated, in HEV mode 3, the second clutch is operated, in engine mode 1, the second clutch and the brake BK are operated, and in engine mode 2, the first clutch and the second clutch are operated.

As described above, the power transmission system according to the first exemplary embodiment of the present invention may implement two EV modes, three hybrid driving modes, and two engine modes.

Hereinafter, an operation principle for each mode will be described below.

[EV Mode 1]

The EV mode is a mode which supplies power of the battery to the motor/generator in the state in which the engine stops to drive the vehicle with the power of the motor/generator.

The EV mode may have a large effect on enhancement of fuel efficiency since the engine stops and perform reverse driving without a separate reverse apparatus and is operated at the time of starting and low-speed driving after stopping and requires a deceleration shift ratio which makes a power source more rapidly rotate than an output member for preventing a vehicle from sliding back on an uphill road or rapid acceleration of the vehicle.

Under the condition, in the EV mode 1, the operation of the second motor/generator MG2 is controlled in the state in which the sixth rotation element N6 is operated as the fixed element by the operation of the brake BK to perform a deceleration output depending on a gear ratio of the second planetary gear set PG2 while performing an input to the fourth rotation element N4.

In this case, the third rotation element N3 of the first planetary gear set PG1 connected to the engine ENG maintains a stop state along with the engine ENG and the second rotation element N2 connected to the output shaft OS and the first transfer gear TF1 rotates clockwise.

[EV Mode 2]

The motor/generator has efficiency which is changed depending on a rotation speed and a torque, which means that a conversion ratio into mechanical energy of the rotation and the torque among electrical energy even though the same current is supplied is different.

That is, a current of the battery used in the EV mode is energy accumulated by combustion of fuel in the engine or regenerative braking and efficiently using the accumulated energy independent of the generated path is directly connected with the enhancement of fuel efficiency.

For this reason, recently, the electric vehicle is inclined to have a transmission of at least two stages and even in the EV mode, the hybrid electric vehicle preferably has a transmission of at least two stages, and therefore even in the exemplary embodiment of the present invention, the hybrid electric vehicle is considered to have the EV mode 2.

In consideration of this aspect, describing the shift process of the EV mode 2, in the EV mode 2, a vehicle speed is increased during the driving in the EV mode 1 and thus the operation of the brake BK is released at the place where the efficiency of the second motor/generator MG2 is poor and the operation of the first clutch CL1 is controlled.

Then, the first clutch CL1 which is the direct connection means of the second planetary gear set PG2 is operated and therefore the second planetary gear set PG2 is in a direct connection state, such that all the rotation elements N4, N5, and N6 provide an output as an input while rotating at the same speed.

In this case, the first planetary gear set PG1 rotates in the state in which the engine stops as in the EV mode 1 and the first and second rotation elements N1 and N2 rotate at an increasing speed as much as an increasing speed of the fifth rotation element N5.

[HEV Mode 1]

In the HEV mode 1, the power of the engine is transmitted to the output member through a mechanical path and an electrical path, and the power distribution is performed by the planetary gear set, and the engine and the motor/generator connected to the planetary gear set may arbitrarily control the rotation speed independent of the vehicle speed and therefore may serve as an electronically controlled continuously variable transmission.

Therefore, the typical transmission has a fixed engine speed and torque with respect to the given vehicle speed, while the electronically controlled continuously variable transmission may freely change the engine speed and the torque, thereby maximizing the operation efficiency of the engine and enhancing the fuel efficiency.

In consideration of this aspect, in the EV mode 1, a speed of the second rotation element N2 of the first planetary gear set PG1 is only restricted by the first transfer gear TF1 and the rest first and third rotation elements N1 and N3 freely rotate.

Therefore, after the engine (ENG) starts using the first motor/generator MG1, the speed of the engine ENG and the first motor/generator MG1 may be controlled independent of the vehicle speed.

In this case, the torque of the first motor/generator MG1 is always clockwise independent of the rotation direction and a sum of the torque of the engine ENG and the torque of the first motor/generator MG1 is transferred to the output shaft to generate a high driving force.

Further, when the first motor/generator MG1 rotates counterclockwise, the first motor/generator MG1 serves as the generator and when the second motor/generator MG2 rotates clockwise (in this case, the engine ENG has a more reduced rotation speed than before), the second motor/generator MG2 serves as the motor.

As such, in the HEV input branch mode 1, since the engine ENG and the first motor/generator MG1 may be controlled in the continuously variable way if necessary, it is possible to exhibit excellent performance in the fuel efficiency and the power performance.

[HEV Mode 2]

In the HEV mode 2, when the vehicle speed is increased while the vehicle is driven in the HEV mode 1, to reduce the rotation speed level of each rotation element of the first planetary gear set PG1 as a whole, the operation of the brake BK is released and the operation of the first clutch CL1 is controlled.

Next, the second planetary gear set PG2 is in a direct connection state by the operation of the first clutch CL1 which is the variable direct connection means and thus all the rotation elements N4, N5, and N6 rotate at the same speed.

In this case, the second rotation element N2 of the first planetary gear set PG1 is only restricted by the output gear OG along with the fifth rotation element N5 of the second planetary gear set PG2, and the first and third rotation elements N1 and N3 freely rotate.

Therefore, when the engine ENG and the first motor/generator MG1 are controlled, the speed of the engine ENG and the first motor/generator MG1 may be controlled in a continuously variable way independent of the vehicle speed.

Further, when the first motor/generator MG1 rotates counterclockwise, the first motor/generator MG1 serves as the generator and when the first motor/generator MG1 rotates clockwise (in this case, the engine ENG has a more reduced rotation speed than before), the first motor/generator MG1 serves as the motor.

As such, in the HEV mode 1→2, since the engine ENG and the first motor/generator MG1 may be controlled in the continuously variable way if necessary, it is possible to exhibit excellent performance in the fuel efficiency and the power performance.

[HEV Mode 3]

In an HEV input branch mode, the rotation speed of the motor/generator connected to the output member is restricted to the vehicle speed and therefore it is difficult to efficiently operate the motor/generator and reduce capacity.

In particular, when the vehicle speed is increased and thus the rotation speed of the motor/generator restricted to the vehicle speed is increased, the efficiency of the motor/generator is reduced and thus the optimal fuel efficiency may not be achieved.

Under this condition, when all of the engine ENG and the two motors/generators MG1 and MG2 may control the rotation speed independent of the vehicle speed by coupling the first planetary gear set PG1 connected to the engine ENG with two different elements of the second planetary gear set PG2 connected to the output shaft OS, the continuously variable transmission function is operated once again to promote the enhancement of fuel efficiency.

Therefore, when the second clutch CL2 is operated, the speed and torque of the second motor/generator MG2 are restricted to the speed and torque of the engine ENG by the second transfer gear TF2 and the first transfer gear TF1 connects the second rotation element N2 to the fifth rotation element N5, such that the speed and the torque may be restricted to each other.

Further, the first and second motors/generators MG1 and MG2 need to have mutual electrical energy balance and all the rotation elements of the first and second planetary gear sets PG1 and PG2 perform an electrically controlled continuously variable transmission function while having interrelationship with the speed and the torque.

[HEV Mode 1→HEV Mode 3]

As described above, in the HEV mode 1, the speed of the engine ENG and the first motor/generator MG1 may be freely controlled in a continuously variable way independent of the vehicle speed and to smoothly convert the HEV mode 1 into the HEV mode 3 without any impact, the engagement is made in the state in which the synchronization of the second clutch CL2 is completed and a fluctuation in the torques of the rotation elements does not occur before and after the synchronization of the second clutch CL2.

Therefore, in the HEV mode 1, since the speed of the engine ENG may be freely changed, the engine ENG and the first motor/generator MG1 are controlled prior to the conversion of the mode to induce the synchronization of the second clutch CL2 and when the synchronization of the second clutch CL2 is completed and then the second clutch CL2 is completely engaged, the change in the torque of the engine ENG and the first and second motors/generators MG1 and MG2 does not occur and therefore the impact due to the mode conversion does not occur.

Further, when the mode conversion into the HEV mode 3 is completed, the operation of the brake BK is released and then the brake BK is controlled in the HEV mode 3.

In the HEV mode 3, since the sixth rotation element N6 of the second planetary gear set PG2 may not receive a torque, the sums of the pure torques input to the fourth rotation element N4 and the fifth rotation element N5 each need to be 0.

That is, in the case of the fourth rotation element N4, the torque of the second motor/generator MG2 balances an external torque input from the second transfer gear TF2 and in the case of the fifth rotation element N5, the input torque balances the external torque input from the first transfer gear TF1 due to a driving resistance.

[HEV Mode 2→HEV Mode 3]

As described above, in the HEV mode 2, the speed of the engine ENG and the first motor/generator MG1 may be freely controlled in a continuously variable way and to smoothly convert the HEV mode 2 into the HEV mode 3 without any impact, the engagement is made in the state in which the synchronization of the second clutch CL2 is completed and a fluctuation in the torques of the rotation elements does not occur before and after the synchronization of the second clutch CL2.

Therefore, in the HEV mode 1, since the speed of the engine ENG may be freely changed, the engine ENG and the first motor/generator MG1 are controlled prior to the conversion of the mode to induce the synchronization of the second clutch CL2 and when the synchronization of the second clutch CL2 is completed and then the second clutch CL2 is completely engaged, the change in the torque of the engine ENG and the first and second motors/generators MG1 and MG2 does not occur and therefore the impact due to the mode conversion does not occur.

Further, when the mode conversion into the HEV mode 3 is completed, the operation of the first clutch CL1 is released and then the first clutch CL1 is controlled in the HEV mode 3.

[Engine Mode 1]

A core technology to enhance the fuel efficiency of the hybrid electric vehicle may be said to be a recovery and reuse of braking energy and a free control of an operation point of the engine.

Further, to control the operation point of the engine, twice energy conversion processes of a process of converting the mechanical energy of the engine into the electrical energy in the motor/generator and a process of converting the electrical energy of the motor/generator into the mechanical energy in the motor/generator again are involved.

The energy conversion causes a loss in the middle of the conversion processes without outputting all energy and under any driving condition, the fuel efficiency may be excellent in the engine mode driven only by the engine rather than in the hybrid driving mode.

That is, in the engine mode 1, when the second clutch CL2 is engaged with the brake BK, the fourth rotation element N4 of the second planetary gear set PG2 rotates counterclockwise by the second transfer gear TF2 depending on the engine speed and since the sixth rotation element N6 stops, an under drive shift ratio is formed. In this case, since the first and second motors/generators MG1 and MG2 need not generate a torque, the engine mode 1 in which the vehicle is driven only by the pure power of the engine ENG is established.

[Engine Mode 2]

In the engine mode 2, when the first clutch CL1 is engaged with the second clutch CL2, the fourth rotation element N4 of the second planetary gear set PG2 rotates counterclockwise by the second transfer gear TF2 depending on the engine speed and all the elements of the second planetary gear set integrally rotate by the first clutch CL1.

Further, since the gear ratio of the second transfer gear TF2 is set so that the second motor/generator MG2 rotates quicker than the engine, an over drive shift ratio is formed. In this case, since the first and second motors/generators MG1 and MG2 need not generate a torque, the engine mode 2 in which the vehicle is driven only by the pure power of the engine ENG is established.

As described above, according to the first exemplary embodiment of the present invention, in the overall configuration, the two EV modes, the three hybrid modes, and the two engine modes may be implemented by the combination of the two planetary gear sets PG1 and PG2, the three friction elements CL1, CL2, and BK1, and the two motors/generators MG1 and MG2.

Further, according to the first exemplary embodiment of the present invention, the power of the engine ENG is input to the third rotation element N3 of the first planetary gear set PG1 and the power of the first motor/generator MG1 is input to the first rotation element N1 to transfer a larger torque than the engine ENG torque to the output shaft OS, thereby increasing the usage of the mechanical power transfer path and using the larger power of the engine than the specification of the same first motor/generator MG1.

Further, according to the first exemplary embodiment of the present invention, the larger torque than the engine torque may be transferred to the output shaft OS to implement the high rotation operation with the large power of the engine ENG at the same vehicle speed at the time of the WOT oscillation and obtain the larger acceleration.

Further, according to the first exemplary embodiment of the present invention, since in the HEV mode, the larger acceleration than the engine mode may be obtained, a necessity of conversion into the engine mode at the time of oscillation is removed to configure the relatively simple system and reduce the friction element depending on the mode reduction, thereby more increasing the efficiency.

Further, according to the first exemplary embodiment of the present invention, for natural conversion from the HEV mode 1 and the HEV mode 2 to the HEV mode 3, the second clutch CL2 is disposed between the third rotation element N3 of the first planetary gear set PG1 and the sixth rotation element N6 of the second planetary gear set PG2 to perform the conversion into the HEV mode 3 after the engine ENG and the second motor/generator MG2 are synchronized with each other by the operation of the second clutch CL2, thereby naturally performing the mode conversion.

Therefore, according to the first exemplary embodiment of the present invention, the impact may not occur due to the engagement of the second clutch CL2, the torque directions of the first motor/generator MG1 and the second motor/generator MG2 are maintained as they are before and after the mode conversion, thereby making the controllability excellent.

Further, as described above, after the conversion into the HEV mode 3, the engine ENG may be continuously operated at a maximum power point and the second motor/generator MG2 may be operated within the motor driving limitation range since the rotation speed is gradually reduced as the vehicle speed is increased.

Further, the engine mode is provided at the time of the high-speed driving to perform the driving without the electrical load of the first and second motors/generators MG1 and MG2, thereby improving the fuel efficiency.

Figure 3:
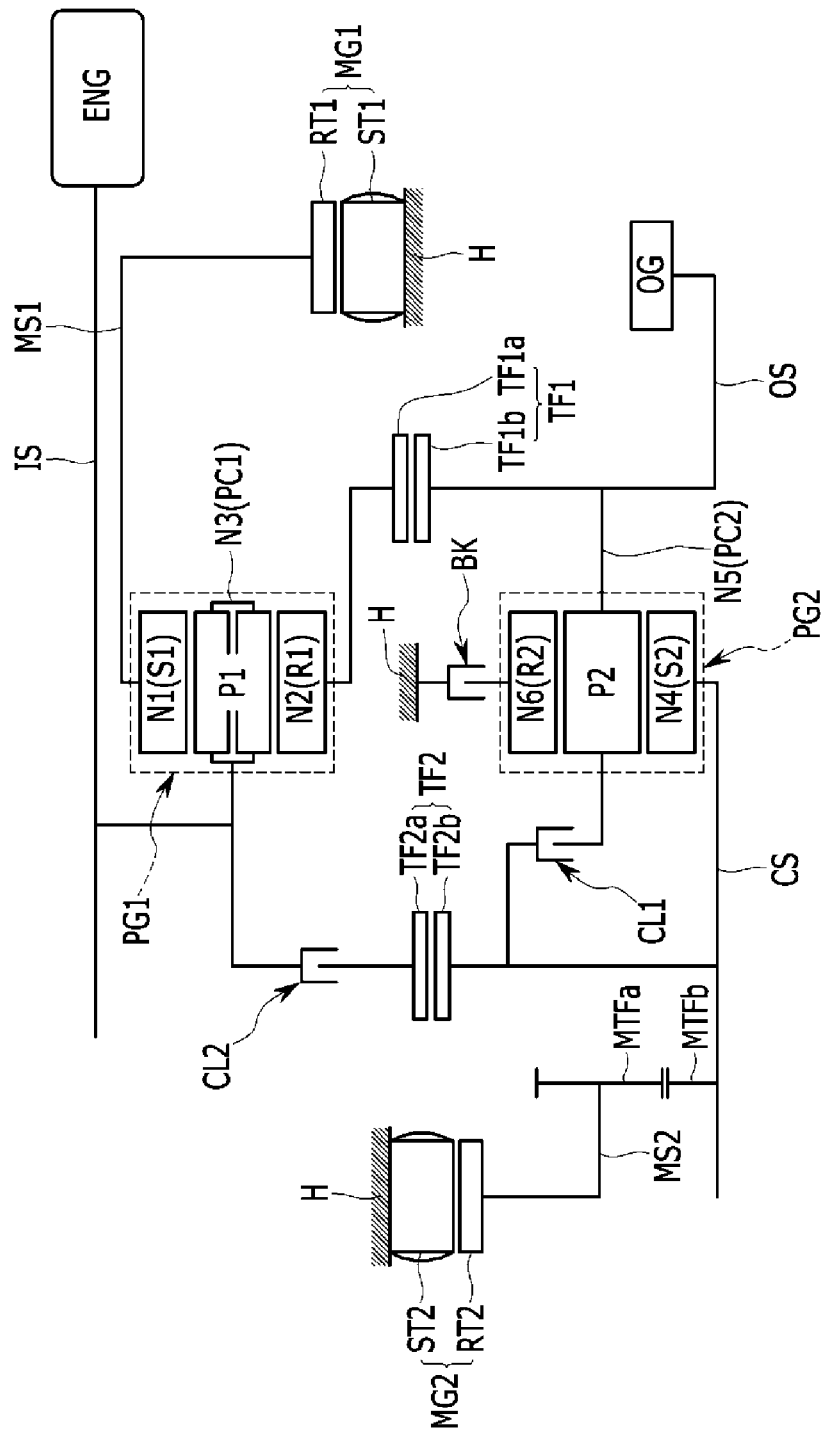
FIG. 3 is a configuration diagram of a power transmission system according to various exemplary embodiments of the present invention.

FIG. 3 is a configuration diagram of a power transmission system according to a second exemplary embodiment of the present invention.

Referring to FIG. 3, according to the first exemplary embodiment of the present invention, the first planetary gear set PG1 is configured of the single pinion planetary gear set but according to the second exemplary embodiment of the present invention, the first planetary gear set PG1 is configured of the double pinion planetary gear set.

Therefore, the first rotation element N1 is configured of the first sun gear S1, the second rotation element N2 is configured of the first ring gear R1, and the third rotation element N3 is configured of the first planetary carrier PC1.

Compared with the first exemplary embodiment of the present invention, in the case of the second exemplary embodiment of the present invention, only the configurations of the second and third rotation elements N2 and N3 are different and the operation effects thereof are the same, and therefore the detailed description thereof will be omitted.

Figure 4:
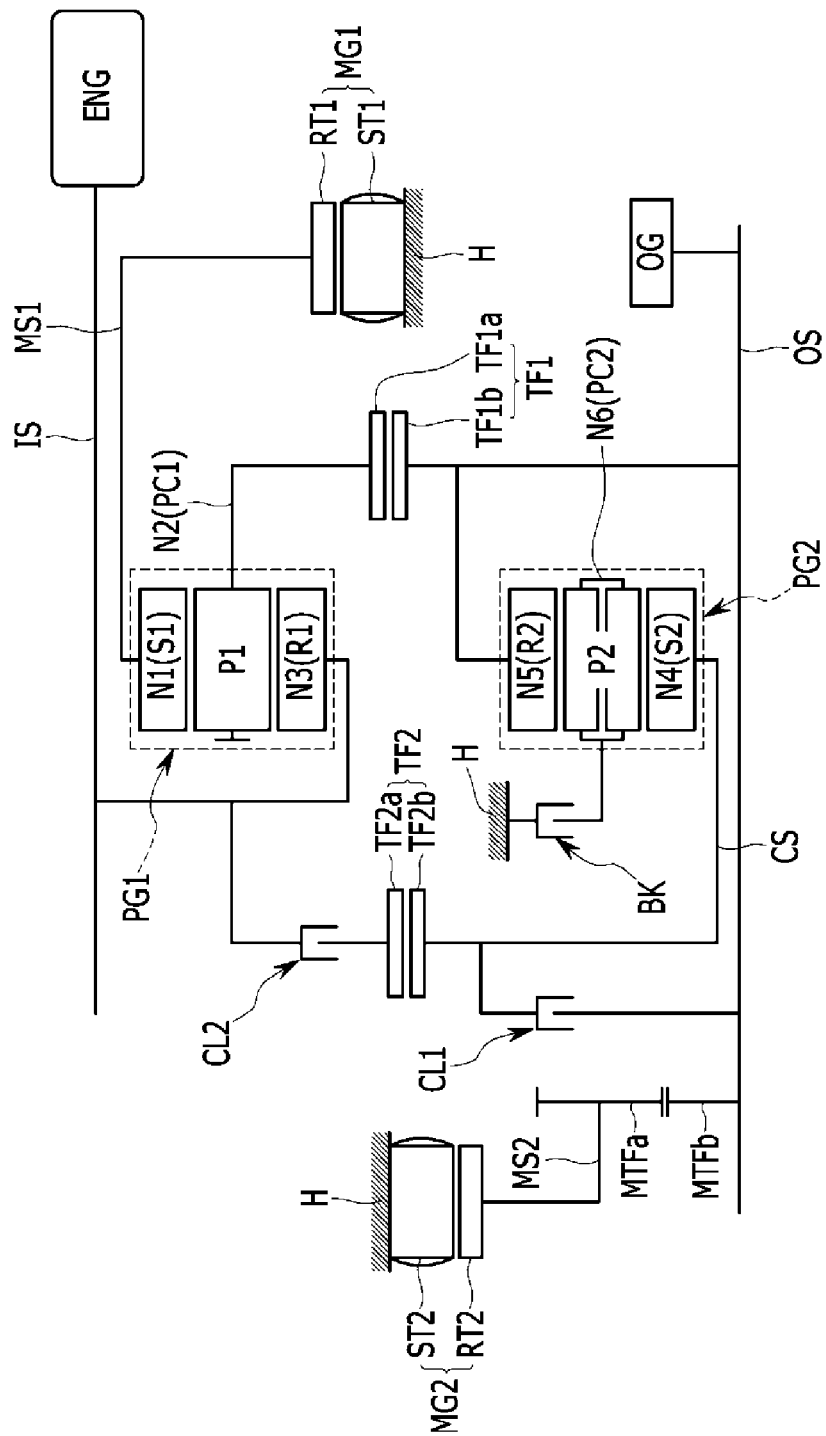
FIG. 4 is a configuration diagram of a power transmission system according to various exemplary embodiments of the present invention.

FIG. 4 is a configuration diagram of a power transmission system according to a third exemplary embodiment of the present invention.

Referring to FIG. 4, according to the first exemplary embodiment of the present invention, the second planetary gear set PG2 is configured of the single pinion planetary gear set but according to the third exemplary embodiment of the present invention, the second planetary gear set PG2 is configured of the double pinion planetary gear set.

Therefore, in the second planetary gear set PG2, the fourth rotation element N4 is configured of the second sun gear S2, the fifth rotation element N5 is configured of the second ring gear R2, and the sixth rotation element N6 is configured of the second planetary carrier PC2.

Compared with the first exemplary embodiment of the present invention, in the case of the third exemplary embodiment of the present invention, only the configurations of the fifth and sixth rotation elements N5 and N6 are different and the operation effects thereof are the same, and therefore the detailed description thereof will be omitted.

Figure 5:
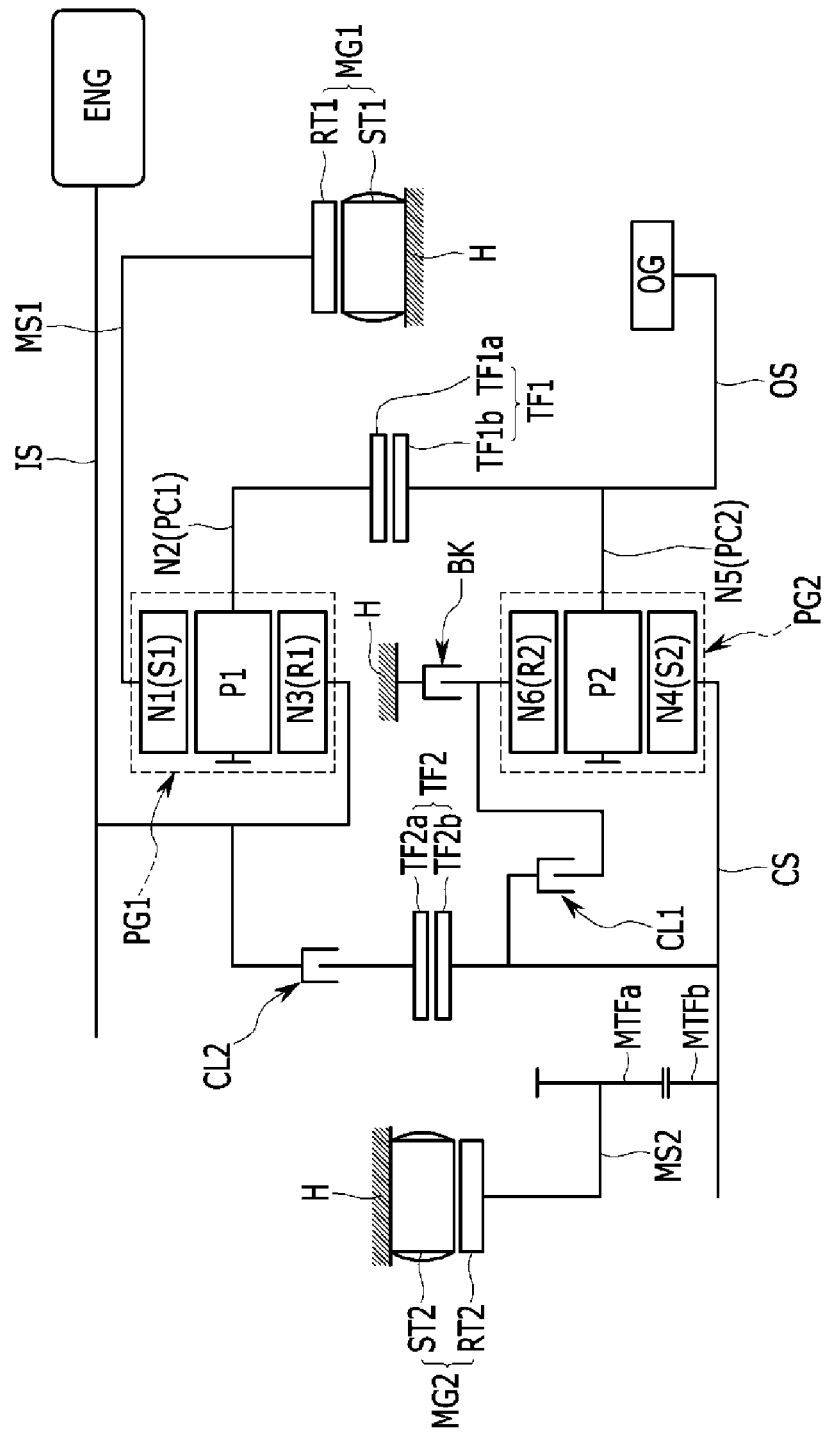
FIG. 5 is a configuration diagram of a power transmission system according to various exemplary embodiments of the present invention.

FIG. 5 is a configuration diagram of a power transmission system according to a fourth exemplary embodiment of the present invention.

Referring to FIG. 5, according to the first exemplary embodiment of the present invention, the first clutch CL1 is disposed between the fourth rotation element N4 and the fifth rotation element N5, but according to the fourth exemplary embodiment of the present invention, the first clutch CL1 is disposed between the fourth rotation element N4 and the sixth rotation element N6.

Compared with the first exemplary embodiment of the present invention, in the case of the fourth exemplary embodiment of the present invention, only the disposition positions of the first clutch CL1 are different and the operation effect thereof is the same, and therefore the detailed description thereof will be omitted.

Figure 6:
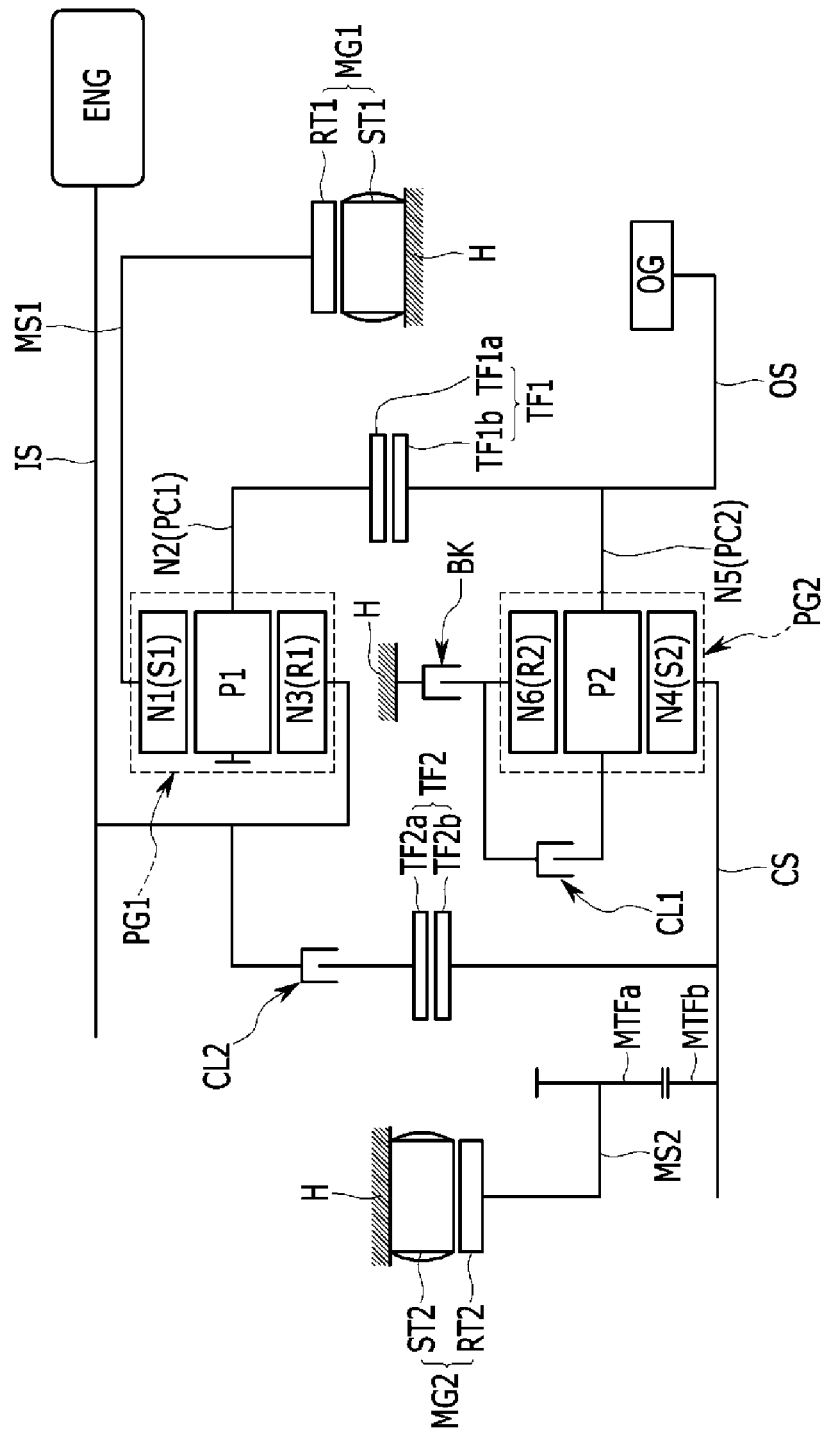
FIG. 6 is a configuration diagram of a power transmission system according to various exemplary embodiments of the present invention.

FIG. 6 is a configuration diagram of a power transmission system according to a fifth exemplary embodiment of the present invention.

Referring to FIG. 6, according to the first exemplary embodiment of the present invention, the first clutch CL1 is disposed between the fourth rotation element N4 and the fifth rotation element N5, but according to the fifth exemplary embodiment of the present invention, the first clutch CL1 is disposed between the fifth rotation element N5 and the sixth rotation element N6.

Compared with the first exemplary embodiment of the present invention, in the case of the fifth exemplary embodiment of the present invention, only the disposition positions of the first clutch CL1 are different and the operation effect thereof is the same, and therefore the detailed description thereof will be omitted.

Figure 7:
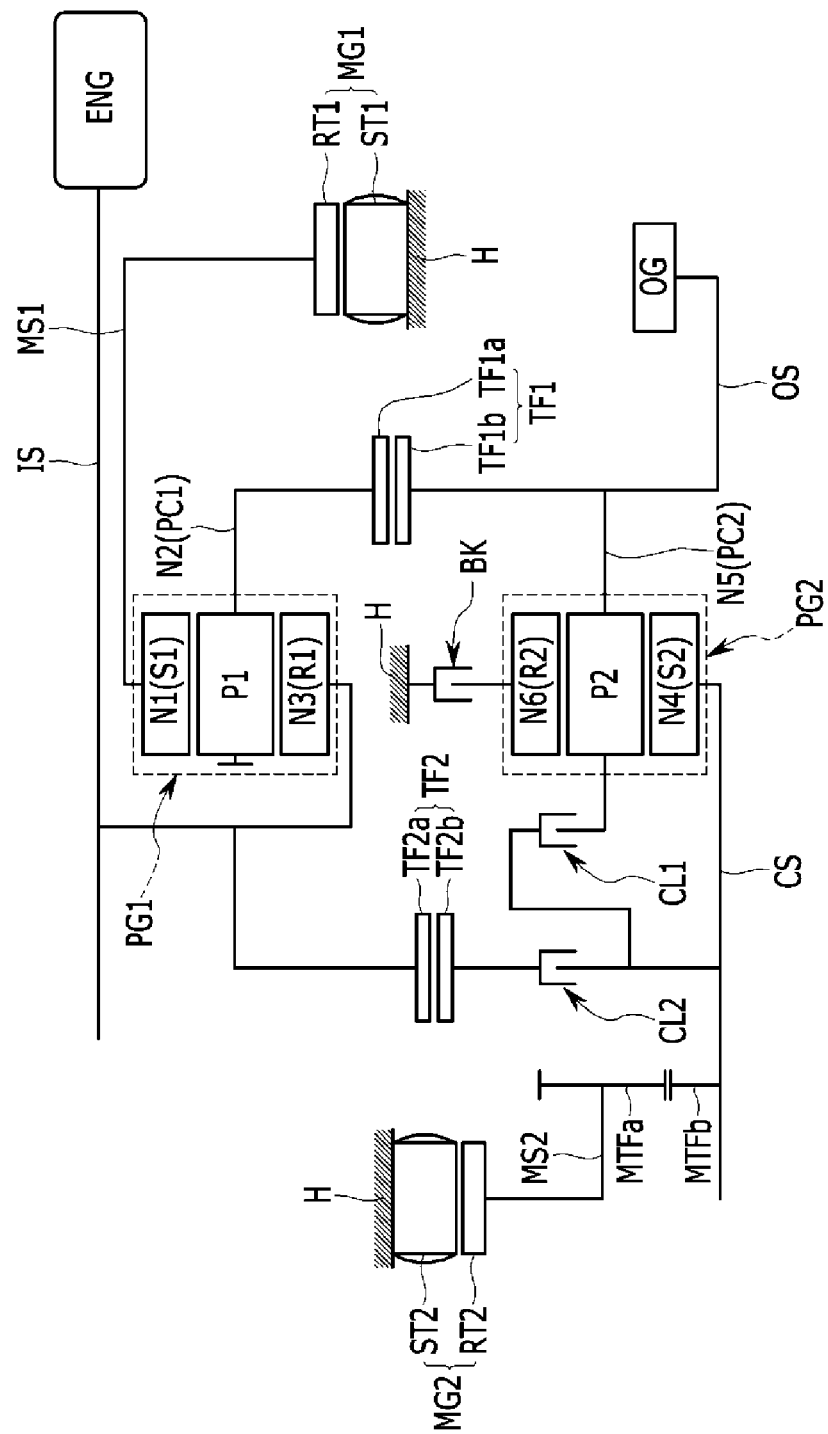
FIG. 7 is a configuration diagram of a power transmission system according to various exemplary embodiments of the present invention.

FIG. 7 is a configuration diagram of a power transmission system according to a sixth exemplary embodiment of the present invention.

Referring to FIG. 7, according to the first exemplary embodiment of the present invention, the second clutch CL2 is disposed between the third rotation element N3 and the second transfer gear TF2, but according to the sixth exemplary embodiment of the present invention, the second clutch CL2 is disposed between the second transfer gear TF2 and the fourth rotation element N4.

Compared with the first exemplary embodiment of the present invention, in the case of the sixth exemplary embodiment of the present invention, only the disposition position of the second clutch CL2 is different and the operation effect thereof is the same, and therefore the detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, comprising:
    an input shaft configured to be input with power of an engine;
    a counter shaft configured to be disposed in parallel with the input shaft at a predetermined interval therefrom;
    an output shaft configured to be disposed on a same shaft line as the counter shaft;
    a first motor/generator configured to be disposed on the input shaft to be operated as a motor and a generator;
    a second motor/generator configured to be disposed in parallel with the counter shaft at a predetermined interval therefrom to be externally gear-connected with the counter shaft;
    a first planetary gear set configured to be disposed on the input shaft to connect a first rotation element to the first motor/generator and externally gear-connect a second rotation element to the output shaft, and directly connect a third rotation element to the input shaft;
    a second planetary gear set configured to be disposed on the counter shaft to selectively externally gear-connect a fourth rotation element to the third rotation element through the counter shaft while being directly connected to the counter shaft and to directly connect a fifth rotation element to the output shaft and selectively connect a sixth rotation element to a transmission housing;
    a first transfer gear configured to be disposed between the second rotation element and the output shaft;
    a second transfer gear configured to be disposed between the third rotation element and the counter shaft;
    a variable direct connection device configured to selectively connect two of three rotation elements of the second planetary gear set; and
    a variable connection device configured to selectively connect the sixth rotation element to the transmission housing or selectively external gear-connect the third rotation element to the fourth rotation element.

2. The power transmission system of claim 1,
    wherein the first planetary gear set is configured of a single pinion planetary gear set, the first rotation element is configured of a first sun gear, the second rotation element is configured of a first planetary carrier, and the third rotation element is configured of a first ring gear, and
    wherein the second planetary gear set is configured of the single pinion planetary gear set, the fourth rotation element is configured of a second sun gear, the fifth rotation element is configured of a second planetary carrier, and the sixth rotation element is configured of a second ring gear.

3. The power transmission system of claim 1,
    wherein the first planetary gear set is configured of a double pinion planetary gear set, the first rotation element is configured of a first sun gear, the second rotation element is configured of a first ring gear, and the third rotation element is configured of a first planetary carrier, and
    wherein the second planetary gear set is configured of a single pinion planetary gear set, the fourth rotation element is configured of a second sun gear, the fifth rotation element is configured of a second planetary carrier, and the sixth rotation element is configured of a second ring gear.

4. The power transmission system of claim 1,
    wherein the first planetary gear set is configured of a single pinion planetary gear set, the first rotation element is configured of a first sun gear, the second rotation element is configured of a first planetary carrier, and the third rotation element is configured of a first ring gear; and
    wherein the second planetary gear set is configured of a double pinion planetary gear set, the fourth rotation element is configured of a second sun gear, the fifth rotation element is configured of a second ring gear, and the sixth rotation element is configured of a second planetary carrier.

5. The power transmission system of claim 1, wherein a gear ratio is set so that the first transfer gear performs a same speed input and the second transfer gear performs an increasing speed input.

6. The power transmission system of claim 1, wherein the variable direct connection device is configured of a first clutch disposed between the counter shaft including the fourth rotation element and the fifth rotation element.

7. The power transmission system of claim 1, wherein the variable connection device includes:
a brake configured to be disposed between the sixth rotation element and the transmission housing; and
a second clutch configured to be disposed between the third rotation element and the second transfer gear or between the fourth rotation element and the second transfer gear.

8. The power transmission system of claim 1, wherein the first motor/generator and the second motor/generator each are disposed between the first transfer gear and the second transfer gear, on the input shaft and the counter shaft.

9. A power transmission system of a hybrid electric vehicle, comprising:
an input shaft configured to be input with power of an engine;
a counter shaft configured to be disposed in parallel with the input shaft at a predetermined interval therefrom;
an output shaft configured to be disposed on a same shaft line as the counter shaft;
a first motor/generator configured to be disposed on the input shaft to be operated as a motor and a generator;
a second motor/generator configured to be disposed in parallel with the counter shaft at a predetermined interval therefrom to be externally gear-connected with the counter shaft;
a first planetary gear set configured to be disposed on the input shaft to connect a first rotation element to the first motor/generator and externally gear-connect a second rotation element to the output shaft, and directly connect a third rotation element to the input shaft;
a second planetary gear set configured to be disposed on the counter shaft to selectively externally gear-connect a fourth rotation element to the third rotation element through the counter shaft while being directly connected to the counter shaft and to directly connect a fifth rotation element to the output shaft and selectively connect a sixth rotation element to a transmission housing;
a first transfer gear configured to be disposed between the second rotation element and the output shaft;
a second transfer gear configured to be disposed between the third rotation element and the counter shaft;
a first clutch configured to be disposed between the counter shaft including the fourth rotation element and the fifth rotation element;
a second clutch configured to be disposed between the third rotation element and the second transfer gear; and
a brake configured to be disposed between the sixth rotation element and the transmission housing.

10. The power transmission system of claim 9, wherein the first planetary gear set is configured of a single pinion planetary gear set, the first rotation element is configured of a first sun gear, the second rotation element is configured of a first planetary carrier, and the third rotation element is configured of a first ring gear; and
wherein the second planetary gear set is configured of the single pinion planetary gear set, the fourth rotation element is configured of a second sun gear, the fifth rotation element is configured of a second planetary carrier, and the sixth rotation element is configured of a second ring gear.

11. The power transmission system of claim 9,
wherein the first planetary gear set is configured of a double pinion planetary gear set, the first rotation element is configured of a first sun gear, the second rotation element is configured of a first ring gear, and the third rotation element is configured of a first planetary carrier; and
wherein the second planetary gear set is configured of a single pinion planetary gear set, the fourth rotation element is configured of a second sun gear, the fifth rotation element is configured of a second planetary carrier, and the sixth rotation element is configured of a second ring gear.

12. The power transmission system of claim 9,
wherein the first planetary gear set is configured of a single pinion planetary gear set, the first rotation element is configured of a first sun gear, the second rotation element is configured of a first planetary carrier, and the third rotation element is configured of a first ring gear; and
wherein the second planetary gear set is configured of a double pinion planetary gear set, the fourth rotation element is configured of a second sun gear, the fifth rotation element is configured of a second ring gear, and the sixth rotation element is configured of a second planetary carrier.

13. The power transmission system of claim 9, wherein a gear ratio is set so that the first transfer gear performs a same speed input and the second transfer gear performs an increasing speed input.

14. A power transmission system of a hybrid electric vehicle, comprising:
an input shaft configured to be input with power of an engine;
a counter shaft configured to be disposed in parallel with the input shaft at a predetermined interval therefrom;
an output shaft configured to be disposed on a same shaft line as the counter shaft;
a first motor/generator configured to be disposed on the input shaft to be operated as a motor and a generator;
a second motor/generator configured to be disposed in parallel with the counter shaft at a predetermined interval therefrom to be externally gear-connected with the counter shaft;
a first planetary gear set configured to be disposed on the input shaft as a single pinion planetary gear set to connect a first sun gear to the first motor/generator and to make a first planetary carrier be externally gear-connected with the output shaft and a first ring gear be directly connected with the input shaft;
a second planetary gear set configured to be disposed on the counter shaft as the single pinion planetary gear set to make a second sun gear be selectively externally gear-connected with the first ring gear through the counter shaft while being directly connected to the counter shaft and to make a second planetary carrier be directly connected with the output shaft and a second ring gear be selectively connected to a transmission housing;
a first transfer gear configured to be disposed between the first planetary carrier and the output shaft;
a second transfer gear configured to be disposed between the first ring gear and the counter shaft;
a first clutch configured to be disposed between the counter shaft including the second sun gear and the second planetary carrier;
a second clutch configured to be disposed between the first ring gear and the second transfer gear; and
a brake disposed between the second ring gear and the transmission housing.

15. The power transmission system of claim 14, wherein a gear ratio is set so that the first transfer gear performs a same speed input and the second transfer gear performs an increasing speed input.

* * * * *